(No Model.)

A. T. LINDERMAN.
CORNER FASTENING FOR CRATES.

No. 413,948. Patented Oct. 29, 1889.

Witnesses:
Frank Blanchard
Charles Shervey.

Inventor
Albert T. Linderman

UNITED STATES PATENT OFFICE.

ALBERT T. LINDERMAN, OF WHITEHALL, MICHIGAN.

CORNER-FASTENING FOR CRATES.

SPECIFICATION forming part of Letters Patent No. 413,948, dated October 29, 1889.

Application filed April 17, 1889. Serial No. 307,545. (No model.)

*To all whom it may concern:*

Be it known that I, ALBERT T. LINDERMAN, a citizen of the United States, residing at Whitehall, in the county of Muskegon and State of Michigan, have invented a new and useful Improvement in Crate-Corner Fastenings, of which the following is a specification.

My invention relates to improvements in the fastenings of the cubical corners of crate-frames composed of angle-woods; and the objects of my improvement are to provide a cheap and strong fastening that can be applied quickly by hand or machine, and that will serve to draw the angle-woods closely and firmly together during the process of applying the fastening. I attain these objects by the fastening and the method of its application, hereinafter described and illustrated.

Figure 1:
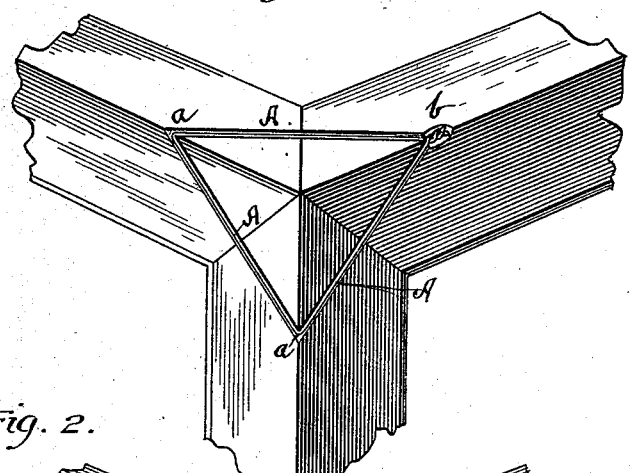
Figure 2:
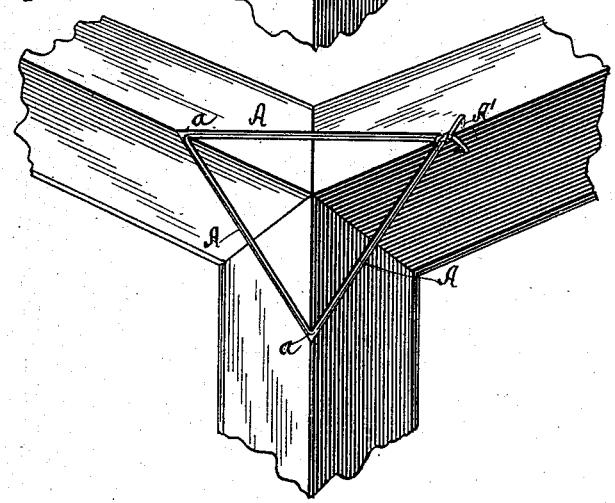
Figure 3:
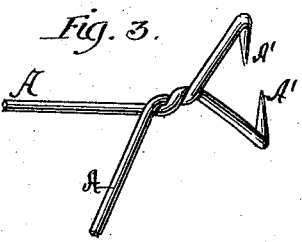

In the accompanying drawings, throughout which like letters of reference indicate similar parts, the different figures represent views of the fastening, as follows:

Figure 1 is a perspective view of a crate-corner fastened with my improved wire fastener, in which the ends of the wire fastener are shown as cut off after they have been twisted together. Fig. 2 is a view of the same, in which the ends of the wire fastener are shown as having a staple-point driven into the angle-wood after the wire ends have been twisted together. Fig. 3 is a view in perspective of the ends of the wire fastener as they appear after being twisted together ready to drive into the angle-wood.

The wire A, when applied by hand, is preferably prepared beforehand by having the points A' made and bent down upon its ends. It is then bent in a triangular form in a way that will bring the two ends together at one corner of the triangle, care being taken that the distance between the bends in the wire between the points *a a* shall be a close fit to the length of one side of the receiving triangular groove made in the angle-wood corner for which the fastener is designed to be used. The points can be separated sufficiently to slip the fastener to place in the groove of the angle-woods between the points *a a*, after which they can be brought together and twisted about each other, at the same time drawing all parts of the angle-wood frame together and fastening it. The points should then be driven into the angle-wood, thereby further increasing the strength of the fastening, and at the same time preventing the ends from possible contact with or catching upon objects with which the crate might come in contact. If, however, the trouble or expense of forming the staple-points upon the wire be objectionable, they can be put on in the way above described and the angle-wood chamfered off, as at *b*, the recess formed by the chamfer forming a place where the twisted ends of the wire can be recessed below possible contact with objects over which the crate passes.

One great object of my improved fastener is the ability in its use to draw together at the same time two sides of the angle-wood corner, this feature being of more importance than the precise method of fastening the ends together, and while I have here shown and described the method I prefer to employ in the fastening of the ends still any method of fastening the ends of the fastener at the corner of the crate-frame I consider would come within the province of my invention.

Heretofore wire fasteners have been used in which the fasteners were united at the side of the triangle. This method only allows a tightening strain during the twisting of the fastener upon one side of the triangular joint, as the breaking of the wire around the angles prevents much draw being brought to bear upon the other sides. Other fasteners have been used in which this difficulty has been overcome by forming loops upon the two sides where the end fastenings did not occur. This method is objectionable on account of the expense and time needed to form the loops and afterward twist them, and also on account of the loops so formed being unsightly and liable to catch upon objects coming in contact with the crate.

I claim—

1. A triangular-shaped fastener for the corners of crates or boxes, the two ends of which fastener are drawn to and fastened at one of the angles of the triangular-shaped fastener, substantially as and for the purposes set forth.

2. A triangular-shaped wire fastener for the corners of crates or boxes, the two ends of which fastener are drawn to and fastened at one of the angles of the triangular-shaped fastener and their points driven into the wood of the crate-frame, substantially as set forth.

3. The combination, with an angle-wood crate-frame provided at the corners with grooves or recesses to receive it, of the triangular-shaped fastener fastened at one of the corners of the crate-frame at or near the groove or recess therein, whereby the tightening or closing of the fastener draws and holds the other two angle-woods to the one where the tightening or closing of the fastener takes place, substantially as described.

4. The combination, with a triangular fastening for angle-wood crate-frames, the ends of which fastener are fastened at one of its angles, of a chamfered-off recess upon the corner of the angle-wood, whereby contact with the ends of the fastener and outside objects is prevented, substantially as shown.

ALBERT T. LINDERMAN.

Witnesses:
   PAUL I. HEDGES,
   JOHN HAMEN.